(12) United States Patent  
Nicolas et al.

(10) Patent No.: US 7,551,899 B1
(45) Date of Patent: Jun. 23, 2009

(54) INTELLIGENT DIALING SCHEME FOR TELEPHONY APPLICATION

(75) Inventors: Regis Nicolas, Jacou (FR); Michel Bonansea, Montpellier (FR); Ronald Tessier, Montpellier (FR); Katell Buchaud, Montpellier (FR)

(73) Assignee: PalmSource, Inc., Sunnyvale, CA (US)

( * ) Notice: Subject to any disclaimer, the term of this patent is extended or adjusted under 35 U.S.C. 154(b) by 178 days.

(21) Appl. No.: 09/728,976

(22) Filed: Dec. 4, 2000

(51) Int. Cl.
*H04B 1/38* (2006.01)
*H04M 1/00* (2006.01)

(52) U.S. Cl. .................. 455/73; 455/564; 455/566; 379/355.01

(58) Field of Classification Search ............. 455/556.2, 455/566, 564, 412.1, 66.1; 379/354, 355.01–356.01, 379/255.1
See application file for complete search history.

(56) References Cited

U.S. PATENT DOCUMENTS

| | | | | |
|---|---|---|---|---|
| 5,349,629 A | * | 9/1994 | Kumano .................. 455/564 |
| 5,708,804 A | * | 1/1998 | Goodwin et al. .............. 707/3 |
| 6,185,295 B1 | * | 2/2001 | Frederiksen et al. ... 379/355.05 |
| 6,222,921 B1 | * | 4/2001 | Mugura et al. .............. 379/354 |
| 6,223,058 B1 | * | 4/2001 | Sudo et al. .................. 455/564 |
| 6,320,943 B1 | * | 11/2001 | Borland ................. 379/112.01 |
| 6,411,822 B1 | * | 6/2002 | Kraft ......................... 455/558 |
| 6,535,749 B1 | * | 3/2003 | Iwata et al. .............. 455/556.2 |
| 6,608,895 B1 | * | 8/2003 | Avidan ................. 379/355.01 |
| 6,766,017 B1 | * | 7/2004 | Yang ..................... 379/355.02 |
| 6,980,642 B1 | * | 12/2005 | Hung et al. ............ 379/355.05 |

* cited by examiner

*Primary Examiner*—Simon D Nguyen
(74) *Attorney, Agent, or Firm*—Berry & Associates P.C.

(57) ABSTRACT

Digits entered by a user are compared against phone numbers maintained in a lists such as address book, phone book, most recent calls, and most often called lists, etc. A number in the lists having matching digits corresponding the digits entered by the user is selected. The user entered digits are displayed in a normal font, and remaining digits from the selected number are displayed in a reverse or highlighted font. In one embodiment, if multiple matches occur, a scroll button allows the user to scroll through the each of the matched numbers. Alternatively, a drop down menu displays the matched numbers in a user selectable format.

18 Claims, 8 Drawing Sheets

INTELLIGENT DIALING SCHEME FOR TELEPHONY APPLICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

This invention relates generally to intelligent selection of items. The invention is more specifically related to intelligent selection of a phone number being dialed by a user.

2. Discussion of Background

Personal computer systems and their applications have become common tools in modern society. To organize their lives, many personal computer users use personal information management applications such as an address book and a daily organizer on their personal computers. Although such applications have proven useful for personal information management, their utility is limited by the fact that the person must be sitting at their personal computer system to access the information.

To remedy this limitation, palmtop computers, electronic organizers and other handheld devices, commonly known as personal digital assistants (PDA's), have been introduced. The PDA is a computer that is small enough to handheld or placed in a pocket, and allows a user and run various applications including personal information management applications such as address books, daily organizers, etc. These applications make people's lives easier.

The most popular brand of PDA is the Palm™. However, the Palm™ is much more than a simple PDA. A basic configuration of the Palm™ 100 is shown in FIG. 1. This small, slim, device, about the size of your wallet, can hold 6000 addresses, 5 years of appointments, 1500 to-do items, 1500 memos, 200 e-mail messages, and can run many different software applications.

The front of the Palm™ 100 is a large LCD screen 110 which is touch-sensitive and allows a user to enter and manipulate data. A stylus (not shown) is provided with the Palm™ to help in making touch screen inputs. By using the stylus (or another handheld pointer) to interact with a touch-sensitive screen, a palmtop user can easily navigate through a host of built-in programs, software, and other applications.

Today, the Palm™, PDA and other handheld computing devices offer Internet connectivity capabilities, as well as a vast array of hardware and software choices. Palmtops have evolved from simple organizers into a new kind of handheld that people use to instantly manage all kinds of information, from email, to medical data, to stock reports.

However, despite the great capabilities and conveniences of the modern PDA, many innovations are needed for expanding the capabilities and for increasing the convenience of using PDAs is needed.

SUMMARY OF THE INVENTION

The present inventors have realized that intelligent dialing of phone numbers in phone devices, and particularly phone enabled PDA's is a convenient and useful to users of those devices.

The present invention provides fast access to numbers being dialed by a user. The invention matches digits dialed by a user to phone numbers maintained in one or more lists of phone numbers. The lists of phone numbers include phone/address book lists, recently dialed numbers, numbers from received calls, numbers from missed calls, most used numbers, and/or other lists maintained by the phone device or PDA.

Digits dialed by the user are displayed on the phone/phone enabled PDA and remaining digits of the selected likely phone number are highlighted, presenting the user with a most likely number which the dialing operation can be completed by one press on the talk button of the cell phone/PDA.

The present invention may be embodied as an intelligent selection device comprising, an item database, an item entry mechanism configured to accept parts of an input item input by a user, a selection mechanism configured to search the database based on the accepted parts of the input item and select an item matching the accepted parts of the input item; and an output mechanism configured to output the accepted parts of the input item and predicted remaining parts of the input item based on the selected item.

The present invention includes a method of intelligently selecting a number, comprising the steps of, accepting digits entered by a user, displaying the accepted digits in a first style, determining a likely number that matches at least part of the accepted digits, and displaying any remainder of the likely number in a second style.

In one embodiment, the present invention displays of list of numbers from the lists matching the input digits. The list is in a user selectable or scrollable format.

Both the device and method may be conveniently implemented on a general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
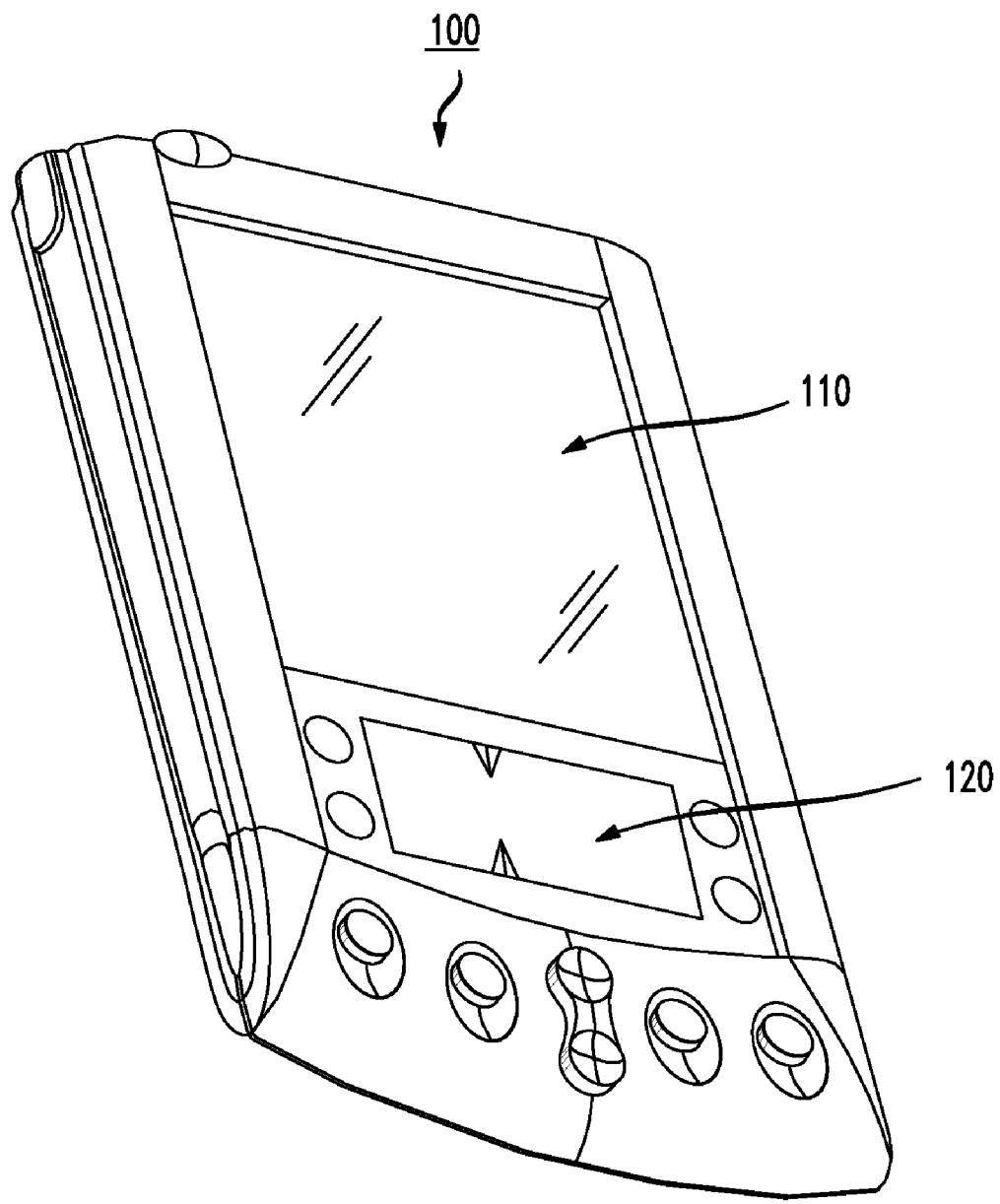
FIG. 1 is a graphic of a Palm™.
Figure 2:
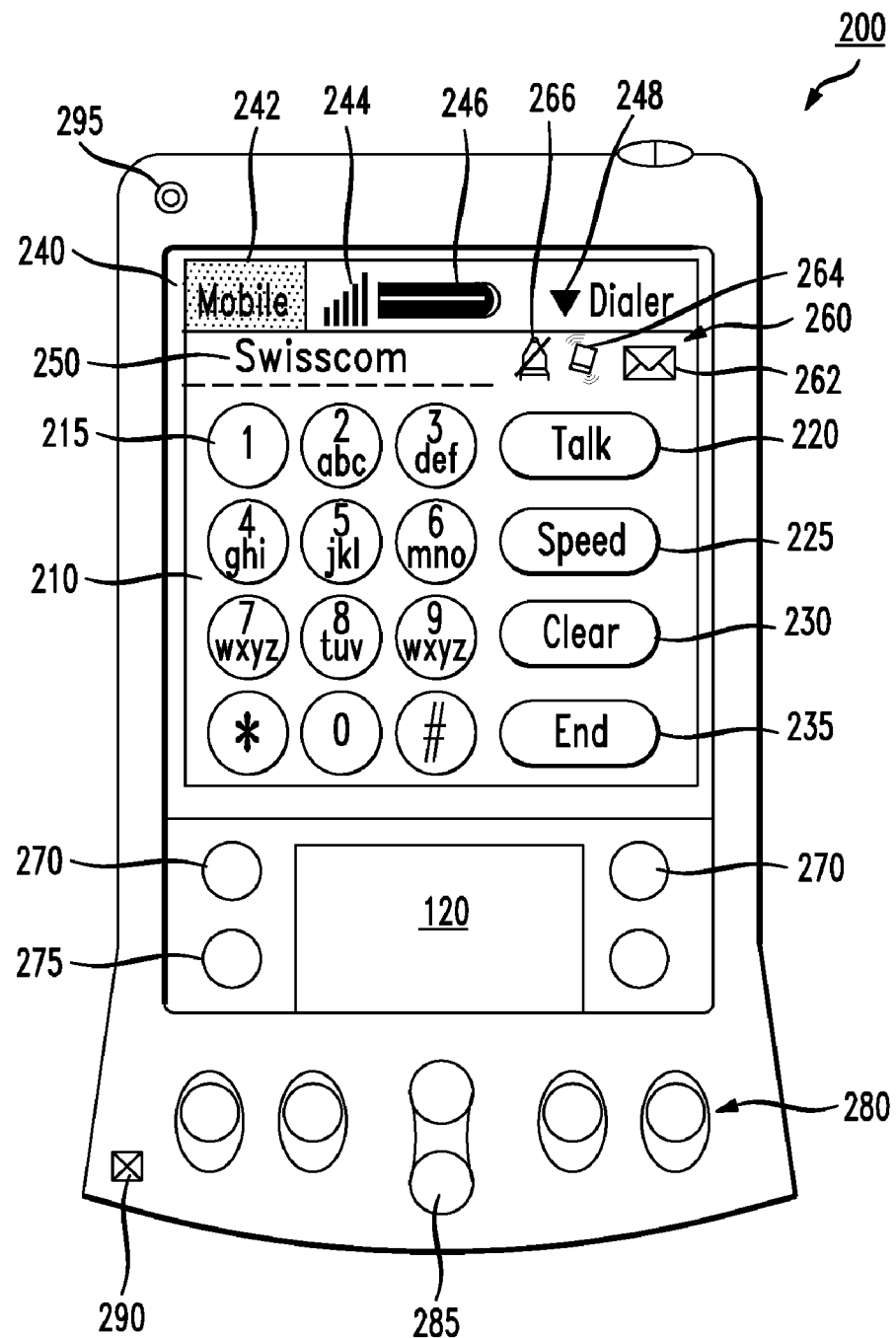
FIG. 2 is a drawing of a Palm™ running a phone application according to the present invention.

Referring again to the drawings, wherein like reference numerals designate identical or corresponding parts, and more particularly to FIG. 2 thereof, there is illustrated a Palm™ handheld computer 200 running a phone application 210 according to an embodiment of the present invention. Although the Palm™ is used to illustrate the various aspects of the invention, it should be understood that the invention as described herein may also be practiced on other devices, including other Palm™ models, PDA's, computer devices, PC's, notebooks, electronic devices, organizers, cell phones, etc.

As shown in FIG. 2, the phone application 210 includes a dialer screen 215 that includes keypad digits 1-9, *, and #, and a set of operation keys. The operation keys include Talk 220, Speed 225, Clear 230, and End 235. User activation of the Talk key initiates a call previously dialed on the keypad 215, or selected from a list or other selection device. User activation of the Speed key 225 brings up a speed dial menu for fast access to frequently dialed numbers. User Activation of the Clear key 230 erases any user inputs for phone numbers or other entries made by the user. And, User activation of the End key 235 terminates the call that the user is currently participating. Additional operational keys may be included (a mute key, not shown, for example).

Phone application 210 includes status bar 240 having indications of phone status, including a mobile indicator 242, signal strength indicator 244, battery life indicator 246, and a dialer pull down menu 248. The mobile indicator 242 gives a name of the application running. In this example, the name of the phone application executing on the Palm™. The signal strength indicator 244 indicates how strong of signal is being received by the telephone device. The dialer pull down menu 248 provides a toggle mechanism that allows a user to toggle between various views of the phone application, including the dialer screen, and call logs (missed calls, received calls, etc.), for example.

A name for the network in which the mobile phone (telephone device 640, for example) operates is displayed at a network name place 250. And, various icons 260 (Voicemail/Short Messaging System Mail 262, Ringer/Vibrator 264, and Mute 266 shown) are displayed and provide corresponding operational controls.

In one embodiment, the operational controls change function via a tap input from a user. For example, ringer on icon 264 (shown as ringing), when tapped, changes to another function (e.g., ringer off, vibrating mode, etc.). Each tap changes the operational control to another function or user preference. Each change also changes the icon to one associated with the new preference. When a final preference is tapped to, the preferences loop returns back to the first user preference. Typically, 2-4 user preferences are activated in this way. Setting high level preferences, such as the ringer status of on, off, and vibrate, each with their own icon, for example. The mute icon 266 (in this embodiment, a bell with a line drawn across it) represents a mute status of the phone (no sound transmitted from the user's side), and, when the Mute 266 is tapped it changes to non-mute status (a bell without the line). When the hand held computer 200 is powered down, the user preferences then active are saved, and, upon next use, on power up, the user preference that was active at power down is retrieved and activated. The user preferences may be saved on a memory device resident in the Palm™ (Memory 620, for example), or, alternatively, may be stored on a remote device connected via a network link (wireless network—not shown, for example).

Other user preferences may be set via the hard buttons 280. Hard buttons on hand held computers can be hardwired (such as typically the case with the power button), or they may be programmed according to an application executing on the handheld computer. In this example embodiment, the phone application 210 includes programming that alters the function of at least some of the hard buttons.

A rocker switch 285 is programmed for adjusting a volume level during a phone call. The volume of audio sent to speakers 295, which are coupled to the telephone device and are utilized for outputting the audio outputs of the phone conversation, increase or decrease depending on whether the top part of the rocker switch 285 (up volume) is pressed, or the lower part (down volume) is pressed. Microphone 290 is used to input audio inputs of the phone conversation. The volume level, when set by the rocker switch is captured in a user preference which is saved and used for a next phone call. When the rocker switch is pressed an indication (bar chart, slide switch, volume step level 1 . . . 10, etc, not shown) may be displayed on display 110 (instead of, or in conjunction with the phone application) to graphically and/or numerically indicate the volume level. Other embodiments do not have an integrated microphone and/or speaker and the rocker switch 285 adjusts the signal strength provided to an output jack (665, FIG. 6, for example).

The Graffiti™ area 120 also includes menu icons 270. These menu icons are programmable to launch or access other features. For example, programmed menu icon 275 for the phone application 210 appears at the lower left hand corner of the Graffiti™ area. tapping the phone application menu icon 275 activates a main preferences menu for changing/setting user preferences for the phone application. In one embodiment, a main user preferences screen provides menu (or other linked pages) access to all preferences. In another embodiment, only the most useful user preferences are accessible directly on the main user preferences screen with an alternate access mechanism for the remaining user preferences. Any method for accessing or changing preferences may be utilized and still be consistent with the preferences aspects of the present invention as described herein.

The phone application may be programmed to have many different user interfaces, including user interface styles, locations, names and/or functions of soft and/or programmable buttons, hardbutton locations, styles, names and functions, etc., other than those described herein and still be consistent with the present invention.

In the present invention, when the user of a phone application begins dialing a phone number, the number appears on the phone application user interface. For example, the number may appear in a reserved specified area of the phone application 210, or a previously used area may be used. In one embodiment, illustrated in FIG. 3, the network name place 250 is used to display the number being dialed. The displayed number includes actual digits dialed (by the user) 300 (shown in regular font) and intelligently selected digits 310 (shown highlighted). The intelligently selected digits 310 may be in reverse video, highlighted, bold, underlines, right of a cursor, or use any other indication distinguishing them from the user dialed digits.

Figure 3:
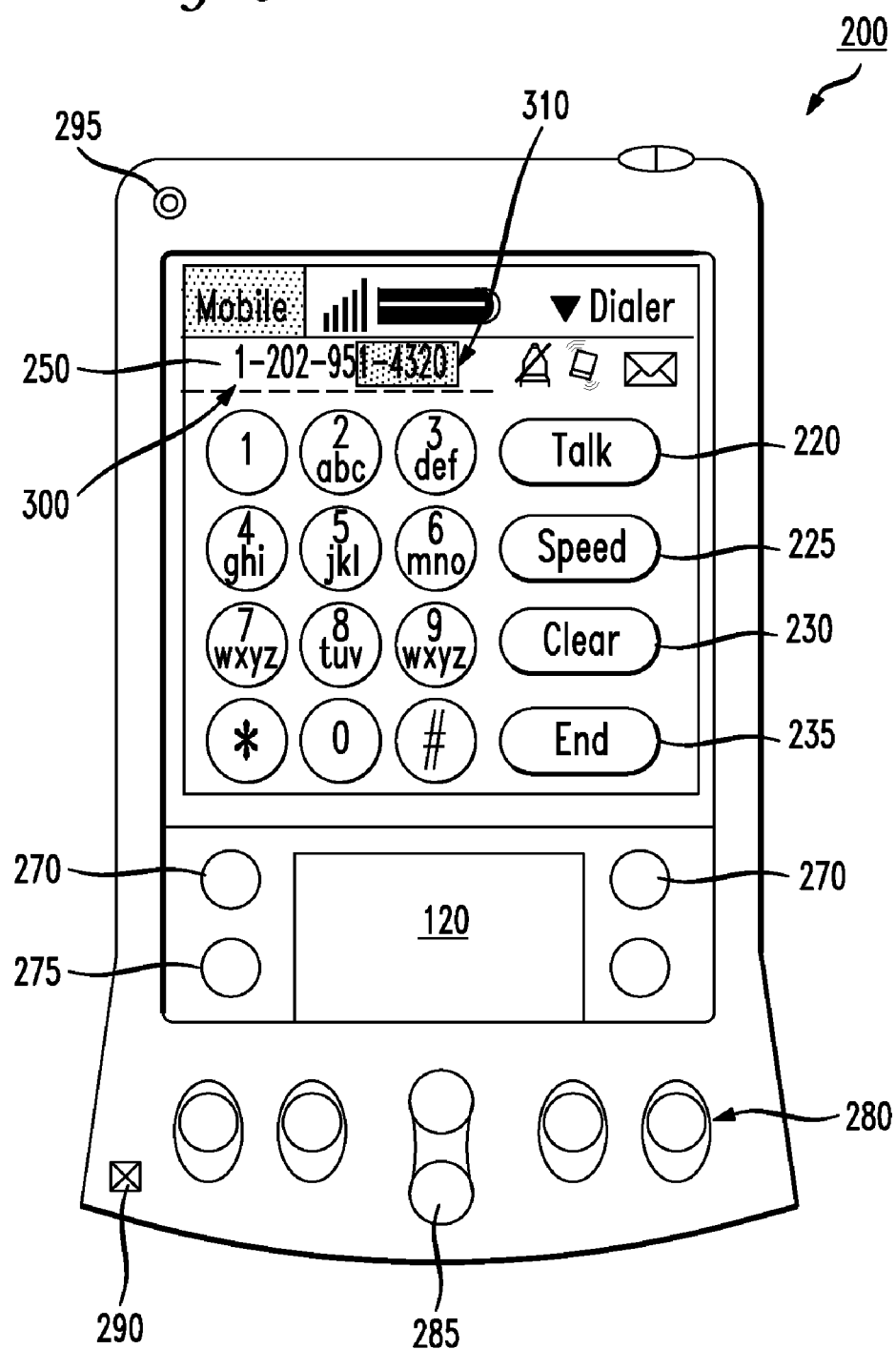
FIG. 3 is a drawing of a Palm™ running a phone application according to the present invention with a user dialed and intelligent selected digits displayed.
Figure 4:
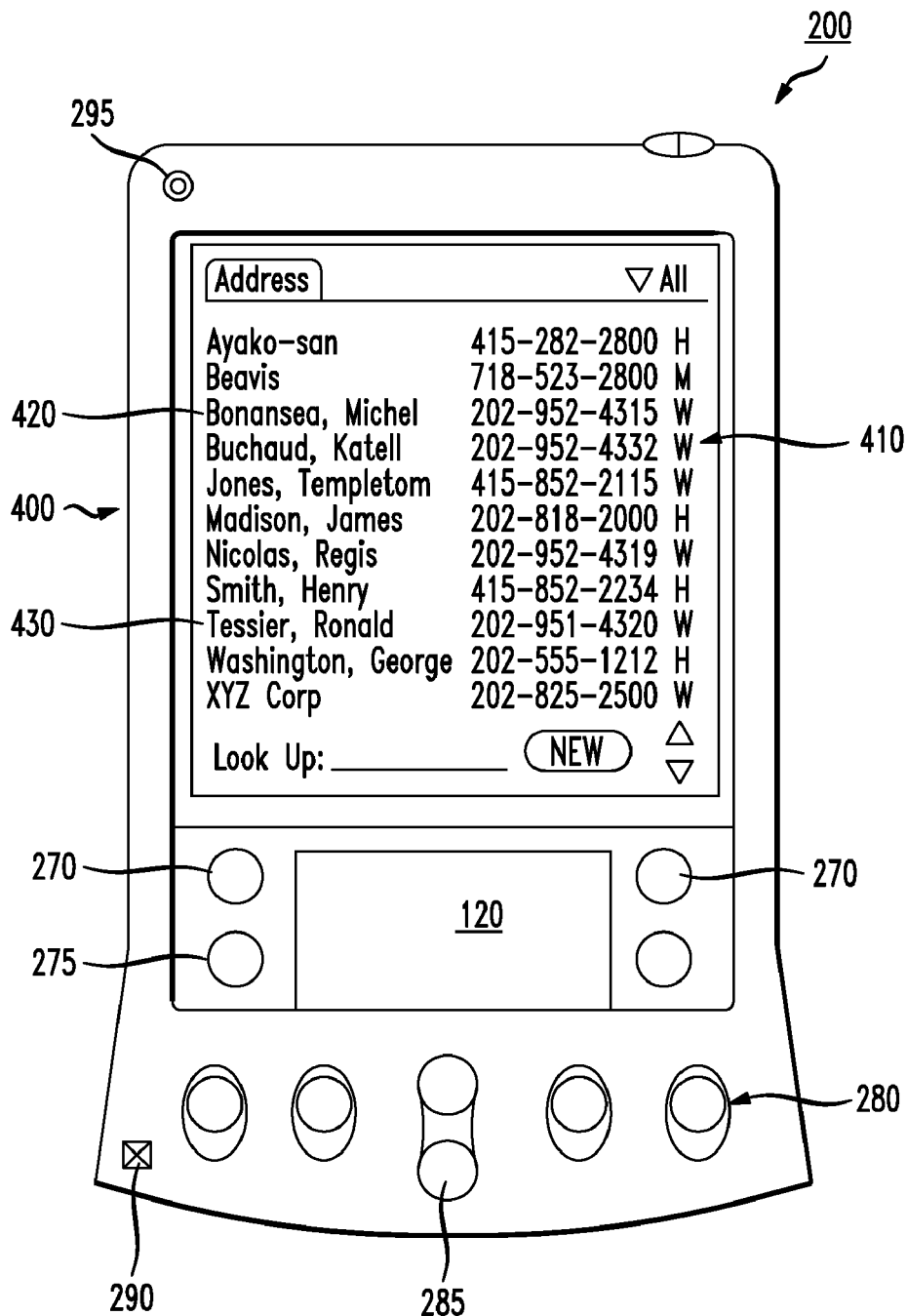
FIG. 4 is a drawing of an example address/phone book list according to the present invention.

As the number is being dialed, the actual digits dialed 300 are checked against phone numbers stored in one or more lists. The lists may be maintained on the Palm™ 200, or may be stored in any retrievable location (phone network storage, for example). If a matching number is found, the remaining digits of the matching number are displayed as the intelligently selected digits 310. FIG. 4 provides an example address/phone book containing names 400 and numbers 410 stored in the Palm™ 200. In the example of FIG. 3, using the address list of FIG. 4, after the user enters 2, a match is found to the number 202-952-4315 (Michel Bonansea) 420. The first digit "2" is displayed in normal font, and the remaining number is displayed highlighted. The match is found by searching the list sequentially, or using other matching techniques (ordering the list by phone numbers and then indexing the list, for example). However, as the user continues dialing until "202-951" is entered, the match is changed to the number 202-951-4320 (Ronald Tessier) 430 because the 6th digit "1" no longer matches the previous number. Again, referring to FIG. 3, the digits actually dialed 300, "202-951," are shown in normal font, and the intelligently selected digits 310, "4320," are shown as highlighted.

Therefore, the first digits dialed by a user are matched with entries in the list, and a matched entry is used to display a complete number with an insertion point set right after the digits actually dialed (the transition from normal font to highlighted in the number displayed).

The matching process continues as the user enters more digits until a complete number has been entered, or the user presses the talk button 220 to initiate the phone call. In one embodiment, if the user presses the end button 235, the matching process is terminated for this phone call only.

Figure 5:
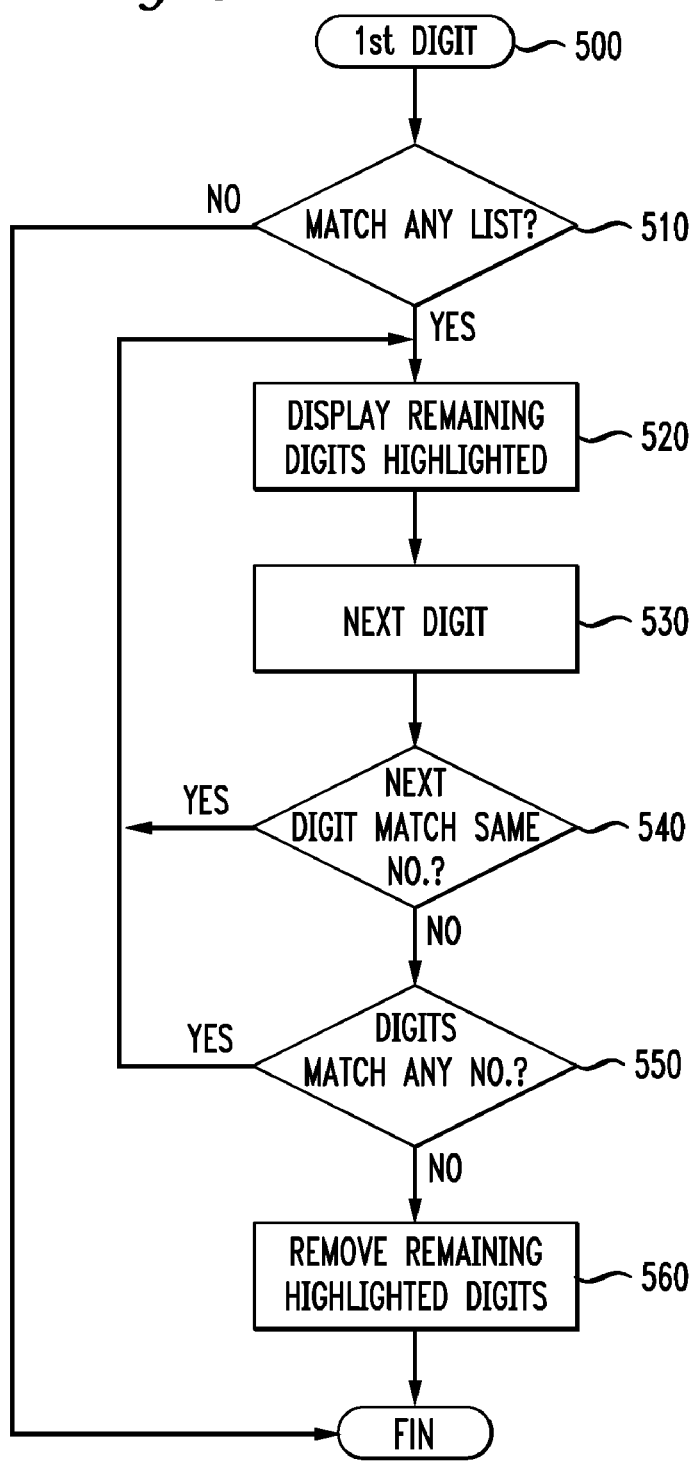
FIG. 5 is a flow chart of a high level process according to the present invention.

Long distance (e.g. 1) and international access codes (e.g. 011) may be included in the search process or selectively ignored depending on the implementation. For clarity, these examples are provided without reference to long distance or access codes. FIG. 5 is a flow chart of one embodiment of the intelligent digit selection processes. At step 500, a first digit is dialed. Alternatively a minimum 2 or 3 digits are first dialed before the matching process begins. At step 510 the list is checked to see if any matching numbers are in the list.

The list may be the address book, a phone list, a list of most recently dialed numbers, a list of most used numbers, a list of SIM card numbers, missed calls, received calls, numbers from a to do list, etc.

Tables 1, 2, and 3 provided some example lists that are used herein for exemplary purposes. Table 1 provides a most recently dialed list. The most recently dialed numbers may be selected based on any recently dialed criteria (the 50 last numbers dialed, or the numbers dialed in the last month, for example).

TABLE 1

| | |
|---|---|
| Abington, Jennifer | 415-882-2754 H |
| Boris, George | 716-523-2805 M |
| Bonansea, Michel | 202-952-4315 W |
| Buchaud, Katell | 202-945-4332 W |
| Jones, Templeton | 415-982-2465 W |
| Nicolas, Regis | 202-952-4319 W |
| Smith, Henry | 415-852-2234 H |
| Wilmington, Dennis | 202-555-1212 H |
| Xerox Company | 415-786-2900 W |

Table 2 provides a list of the most used numbers. The most used numbers may be selected based on any most used criteria (numbers dialed more than once, or numbers dialed three or more times, or numbers dialed multiple times in the last month, for example).

TABLE 2

| | |
|---|---|
| Ayako-san | 415-282-2800 H |
| Beavis | 718-523-2800 M |
| Bonansea, Michel | 202-952-4315 W |
| Buchaud, Katell | 202-945-4332 W |
| Chen, Lu | 415-895-2737 H |
| Jones, Templeton | 415-852-2115 W |
| Madison, James | 202-818-2000 H |
| Nicolas, Regis | 202-952-4319 W |
| Smith, Henry | 415-967-2234 H |

TABLE 2-continued

| | |
|---|---|
| Tessier, Ronald | 202-951-4320 W |
| Washington, George | 202-555-1212 H |
| XYX Corp | 202-825-2500 W |

Table 3 provides an example of numbers stored on a SIM Card. The SIM card stored numbers are provided based on any criteria.

TABLE 3

| | |
|---|---|
| Aires, James | 415-282-2800 H |
| Bantera, Beavis | 718-523-2800 M |
| Bonansea, Michel | 202-952-4315 W |
| Buchaud, Katell | 202-945-4332 W |
| Chen, Stella | 415-833-1839 H |
| Nicolas, Regis | 202-952-4319 W |
| Smith, Henry | 415-967-2234 H |
| Tessier, Ronald | 202-951-4320 W |
| Washington, George | 202-555-1212 H |
| Xenia, Ohio | 614-825-2500 W |

And, Table 4 provides an other list of numbers which may be determined based on any criteria (missed calls, or calls received, for example).

TABLE 4

| | |
|---|---|
| Ayako-san | 415-282-2800 H |
| Beavis | 718-523-2800 M |
| Bonansea, Michel | 202-952-4315 W |
| Buchaud, Katell | 202-945-4332 W |
| Madison, James | 202-818-2000 H |
| Nicolas, Regis | 202-952-4319 W |
| Tessier, Ronald | 202-951-4320 W |
| Washington, George | 202-555-1212 H |
| XYX Corp | 202-825-2500 W |
| Zhang, Kitty | 202-952-0008 H |

Again, the lists may be maintained in the Palm™ or other electronic device implementing the invention, or may be stored in an accessible off-site location (access via a web connection, for example). In addition, the lists may be combined, such as phone book and most recently used, phone book and missed calls and most recently used, etc. In addition, other intelligent schemes my be implemented to order the relevance of each list or combined lists. For example, Phone book ordered by most recently used with the most recently used list interspersed based on recentness. In other embodiments, the lists may searched sequentially in a predetermined or preferred order (as set by preferences, for example).

In one embodiment, the most recently used numbers is searched first, then missed calls, received calls, and finally the address book is searched. Any order of lists, or ordering of numbers within the lists, and/or combination of lists may be utilized.

If the digit(s) dialed by the user do not match any numbers in the list(s), then the intelligent dialing scheme is exited, and the remaining digits are left to the user to input by hand or other means. If a number in one of the lists matches the digit(s) dialed by the user, the matched number is used to complete the display of the number being dialed (as shown in FIG. 3, for example). At any time after the complete number is displayed (e.g., dialed digits normal font, and remaining (intelligently selected) digits highlighted), the user may press talk to initiate the phone call.

At step 530, a next digit is dialed by the user. The next digit is checked to see if it also matches the number previously matched in step 510. If so, the next digit is no longer highlighted, and the previously matched number continues to provide the remaining digits (intelligently selected digits) at step 520. If the next digit was the last number, then the entire number is displayed without any highlighting.

If the next digit does not match the previously matched number, the digits dialed are checked to see if they match any other number in the list(s). Again, similar processes for scanning multiple or combined lists may be utilized. If a matching number is found, the process continues, with the newly matched number providing the remaining (intelligently selected) digits. If no numbers in the list(s) match the digits dialed, the highlighting is turned off (step 560), and the remaining digits are left for the user to enter.

A feature of the present invention utilizes multiple matches in the list(s) to provide the user with a selection choice from the multiple matches. In one embodiment, multiple matches can be scrolled through circularly using the an up arrow or down arrow button (not shown) displayed on the phone application. In another embodiment, the rocker switch is programmed to scroll through the multiple matches during the dialing process. For example, using the address/phone book list shown in FIG. 4, and the additional lists provided in Tables 1-4 as a set of lists for matching digits dialed by the user, if the user enters the digits "415-8," then, each of the following are matched:

| From the Address/Phone book => | |
|---|---|
| Jones, Templeton | 415-8<u>52-2115</u> W |
| Smith, Henry | 415-8<u>52-2234</u> W |
| From Table 1 => | |
| Abington, Jennifer | 415-8<u>82-2754</u> H |
| Smith, Henry | 415-9<u>52-2234</u> W |
| From Table 2 => | |
| Jones, Templeton | 415-8<u>52-2115</u> W |
| Chen, Lu | 415-8<u>95-2737</u> H |
| From Table 3 => | |
| Chen, Stella | 415-8<u>33-1839</u> H |
| From Table 4 => | |
| None | |

Removing duplicates, the user is provided with choices of:

| | |
|---|---|
| Abington, Jennifer | 415-8<u>82-2754</u> H |
| Smith, Henry | 415-9<u>52-2234</u> W |
| Jones, Templeton | 415-8<u>52-2115</u> W |
| Chen, Lu | 415-8<u>95-2737</u> H |
| Chen, Stella | 415-8<u>33-1839</u> H |

The phone numbers displayed on the phone application (network name place 250, FIG. 3, for example) are selected from the list having the highest priority (as set in preferences for example). In this example, if the most used numbers list (Table 2) is the highest priority, then, the number for Chen, Lu, 415-895-2737 is displayed ("415-8" in normal font, and "95-2737" highlighted, for example). The other matched numbers form each of the other lists can be accessed, and displayed on the dial area (250, for example) by pressing the rocker switch (one number displayed for each press). In this manner each of the numbers may be displayed. If the number to be dialed is found, the user only needs to press talk, and the phone call is initiated. If the number to be dialed is not in one of the matched numbers from the list(s), then the user enters more digits to complete the number to be dialed.

Figure 6:
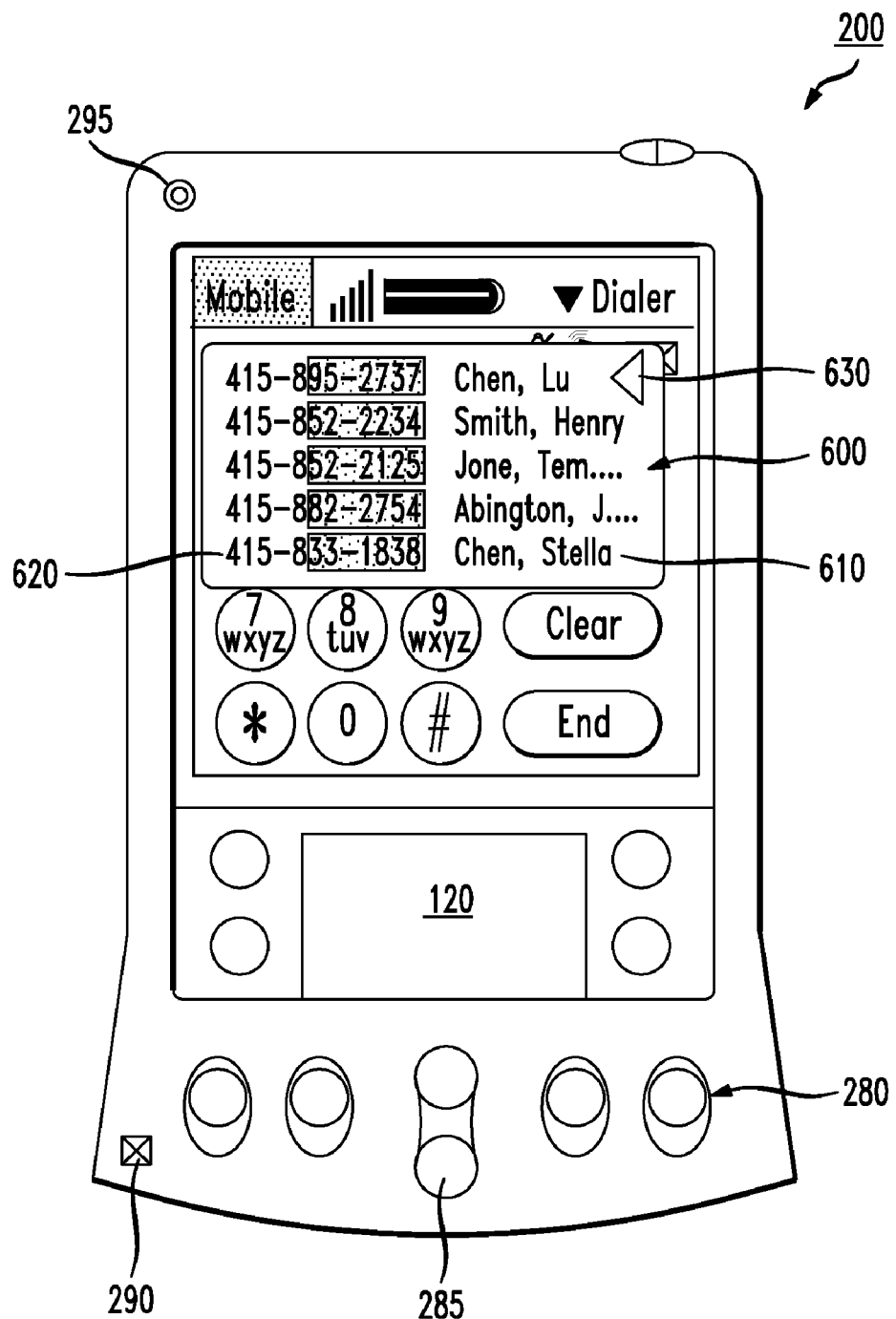
FIG. 6 is an illustration of a drop down menu having intelligently selected numbers from list(s) according to an embodiment of the present invention.

In one embodiment, the user is provided with a list of matching numbers from which to select. Referring to FIG. 6, and using the immediately preceding example, a list is displayed on a drop down screen 600, or a separate screen, listing each of the matched names 610 and numbers 620. If one of the matched numbers is the number the user is dialing, then the user may select the number by tapping on the number to be dialed, or selecting it using the rocker switch 285 (programmed to move a selection arrow 630, or other pointing device, to the selected phone number). In this example, a selection arrow 630 is defaulted to the highest priority match (Chen, Lu), and by pressing the rocker switch 285 down (bottom portion of the rocker switch) 2 times, then Jones, Templeton is selected. Pressing the Rocker switch 285 up once loops back to the bottom of the list, selecting Chen, Stella. When the desired number is selected, the call is initiated by pressing the Talk (or equivalent) button (often colored green). Again, alternatively, the name or number of the phone to be dialed may also be tapped with a stylus on the touch sensitive screen (if available), which either selects the name/number, or automatically begins dialing.

The drop down screen 600 is invoked automatically after a predetermined number of digits is dialed by the user (1, 2, 3, or 4 for example). In one alternative, a long press of any digit activates the drop down menu. For example, in a "Four digits dial" implementation, the user enters "415-8," as in the above example, except that the user holds the fourth digit for a predetermined prolonged time period (3 seconds, for example). This is a long press. In another implementation of the four digits dial as described above is: according to user preferences (phone number matching: begin, contain, end), after the long press on the fourth digits, the list displays all the phone numbers either beginning by the four digits, or containing the four digits, or ending by the four digits. The Palm™ or other electronic device implementing the invention recognizes the long press and then activates the drop down menu (or other selection screen) containing all matched numbers (from any one or more combinations of available lists).

In one embodiment, the drop down menu is populated via a sub-launch of the address book of the Palm™. Preferences data is utilized to determine if the address book is the only list from which to find numbers, or if other lists are utilized in searching for number matches.

Figure 7:
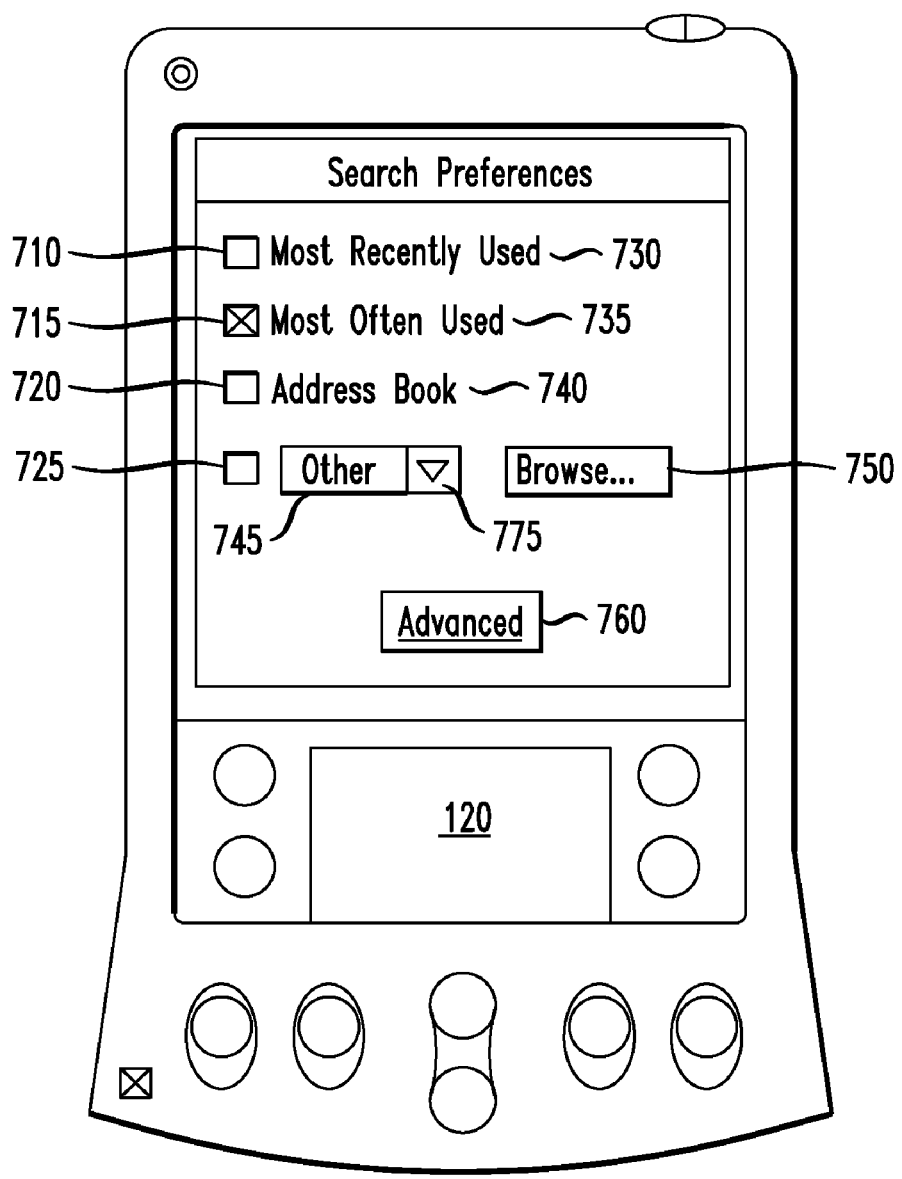
FIG. 7 is an illustration of a search preferences screen according to an embodiment of the present invention.

FIG. 7 provides an example Search Preferences screen 700 for inputting and saving user preferences related to the intelligent dialing operations of the present invention. Checkboxes 710-725 are used to select a priority list for searching for matches to user dialed digits. Checkbox 710 selects the most recently used 730 phone numbers, checkbox 715 (selected in FIG. 7) selects the Most Often Used phone numbers 735, checkbox 720 selects the address book 740, and checkbox 725 selects a user selected "Other" list 745. The "Other" list may be selected via a pull down menu 755 that provides a listing of all available, or a selection of available lists. Alternatively a Browse mechanism 750 is provided that allows the user to search for a specific listing, database containing phone numbers, or a superlist constructed from one or more available lists. An advanced button provides user selectable options for combining lists or other advanced features (pre-sorting of lists, for example).

Figure 8:
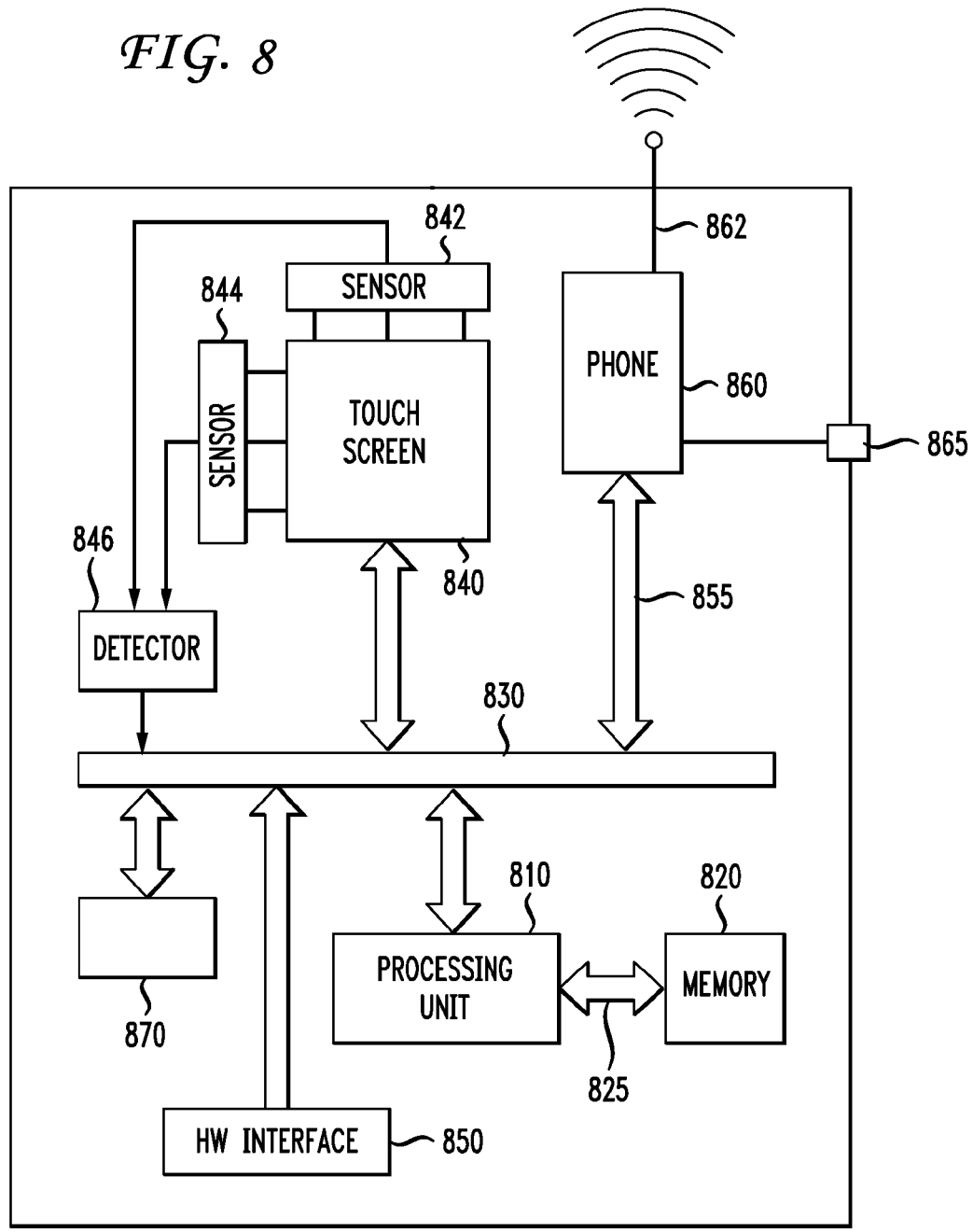
FIG. 8 is a block diagram of selected internal components of an electronic device configured according to an embodiment of the present invention.

FIG. 8 is a block diagram of selected internal components of an electronic device according to an embodiment of the present invention. The electronic device may be a phone enabled PDA, Palm™, handheld computer, cell phone, etc. The selected components include a Processing Unit 810, memory device 820 and memory bus 825. The processing unit accesses and runs programs stored in the memory device 820, including the phone application and its subprograms. The subprograms utilized by the Phone application include a subprogram for the dialer screen and dialer screen related operations, a subprogram for taking notes, a subprogram for accessing and updating an address book, and a subprogram for setting user preferences as described herein. The subprograms may be individual stand alone, separately compiled, programs activated by the phone application or subprograms resident within the phone application. The phone application and subprograms may be software compiled and then downloaded to the Palm™, compiled and resident in firmware, or lines of code downloaded and executed (e.g. Java type programs) or interpreted by another program executing on the electronic device, or a combination of various program types. Similarly, memory device 820 may be a random access memory (RAM), read only memory (ROM), other memory device (firmware, EPROM, Flash memory, bubble memory, etc.), or a combination of the various memory types.

The phone application and its subprograms are executed on processing unit 810. Display information from the programs, including the user interface (dialer screen, or user preferences selection screen, for example), is sent to display mechanism 840 via a system bus 830. Display mechanism 840 is preferably a touch sensitive screen (including touch input sensors X 842, Y 844, and detector 846 are shown).

Hardware interface 850 connects to external control mechanisms (hard buttons 280, for example) whose functions may be hardwired or programmed by the phone applications (or other applications). User selections and actions are retrieved via touch screen and/or hard button inputs as programmed by the phone application and sent to the phone application using Palm™ touch screen and hard button input mechanisms.

A telephone device 860 communicates with a network carrier (Swisscom, for example) via antenna 862 to make telephone calls as directed by the phone application running on the processing unit 810. The carrier may be any type of phone service carrier, including any of satellite, PCS, cellular, radio, landline (POTS), and other communication modes (cellular shown). Incoming call indications (including incoming call, caller ID, call status, etc.) are sent from the telephone device 860 to the phone application via the system bus 855. Although a system and memory bus are shown, any mode of data communication between the various modules may be provided. The phone application initiates calls and directs call operations by sending commands to the telephone device (via the system bus, for example). An audio I/O port 865 is shown for attaching a microphone and audio earphones (or earplug) for use with the telephone device 860.

The configuration shown in FIG. 8 is for exemplary purposes for discussing the present invention. Many different combinations of processing units, programs, memory units, and telephone devices (modules) will be apparent to those skilled in the art to perform similar operations as required by the present invention. Therefore the present invention should not be limited by any particular hardware/software combination as many such combinations may be used to practice the invention as described herein.

In one embodiment, the intelligent dialing scheme of the present invention is embodied in source code programming, compiled (.prc, for example), and stored in the memory 820, and then executed in processing unit 810 when sub-launched by the phone application 210.

Although the present invention is described in terms of a phone application, it should be understood that the same principles may be applied to any device where a value entry can be made in part, and that part can be compared against a list or database of values to intelligently select those values. For example, in an ordering system that requires part numbers, item names, or addresses, then a part number, item name, or address from a list or database may be selected similarly as discussed above and displayed for user selection.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory Ics), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, maintaining one or more lists, intelligently searching one or more lists based on dialed digits, prioritizing lists and/or search results, selecting list entries, dialing a phone according to user selected phone entries, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method of intelligently selecting a telephone number for a dialing operation to initiate a communication with another device, by a user on a combined telephonic and personal computing device, comprising the steps of:
   accepting digits entered by a user via the combined telephonic and personal computing device that performs computing and telephonic operations;
   displaying the accepted digits in a first style on the combined telephonic and personal computing device;

determining likely numbers, any part of which match the accepted digits by searching stored data relating to the telephone numbers, the telephone numbers residing in contact information, call history or lists maintained on the combined telephonic and personal computing device;

ranking of likely numbers in some priority, based on recorded information about usage of such likely numbers;

displaying any remainder of the likely numbers in a second style on the combined telephonic and personal computing device;

canceling said steps of determining and displaying any remainder when a cancel signal is initiated by said user; and then dialing a phone number with the accepted digits upon receipt of a call initiation signal to establish communication with the other device associated with the phone number.

2. A method of intelligently selecting a telephone number for a dialing operation by a user on a combined telephonic and personal computing device, comprising the steps of:

accepting digits entered by a user via the combined telephonic and personal computing device;

displaying the accepted digits in a first style on the combined telephonic and personal computing device;

determining a likely numbers, any part of which match the accepted digits by searching stored data relating to telephone numbers, the telephone numbers residing in contact information, call history or lists maintained on the combined telephonic and personal computing device;

ranking of likely numbers in some priority, based on recorded information about usage of such likely numbers;

displaying any remainder of the likely numbers in a second style on the combined telephonic and personal computing device;

recognizing a long press entry used to enter one of said digits; and after recognition of the long press;

displaying the matching numbers in a user selectable list and executing a dialing operation to establish communication with another telephone based on a specific number selected by the user; or changing the search mode and updating the list accordingly.

3. An intelligent selection device in a combined telephonic and personal computing device for implementing an operation to establish a communication with another telephonic device, comprising:

an item database with stored items and lists of the items for different categorizations or multiple databases for different categorizations;

an item entry mechanism configured to accept at least certain parts of an input item input by a user to display the input item in one style;

a selection mechanism configured to search the item database based on the accepted parts of the input item and select an item with a part matching the accepted parts of the input item, said selection mechanism further configured to select multiple items;

an output mechanism configured to output the accepted parts of the input item and a portion of a selected item, said selection mechanism is further configured to select multiple items; and the output mechanism is further configured to display the multiple items in another style in a user selectable format only after receipt of the specific command wherein the specific command is a press of a digit by the user;

wherein the portion of the selected item is not displayed unless a specific command comprising an alternate entry of a part of the input item is performed by the user; and executing the operation to establish communication with another telephone associated with the selected item.

4. The intelligent selection mechanism according to claim 3 further comprising an initiate button configured to initiate an action based on said output.

5. The method according to claim 3, wherein the accepted parts comprise digits of a telephone number and the output mechanism comprises a display driver of a PDA cell phone combination device.

6. The method according to claim 5, wherein the alternate entry comprises a long press of a keypad on the PDA cell phone device of one of the digits.

7. A computer readable media, having instructions stored thereon, that, when loaded into a computer coupled to a phone mechanism and executed by the computer, cause the computer to perform the steps of:

accepting digits entered by a user via the phone mechanism;

displaying the accepted digits in a first style on the phone mechanism;

determining a set of most likely numbers which in some part match the accepted digits by comparing the accepted digits with stored data on the computer readable media, the stored data comprising lists of numbers maintained in contact lists and call history lists;

ordering the list into likeliness based on some determining algorithm dependent on properties or usage of the stored numbers;

displaying a remainder of the most likely number in a second style on the phone mechanism;

recognizing a long press of a digit entered by a user via the phone mechanism; and displaying the set of numbers, each matching, in part, the accepted digits only upon negotiation of the long press, wherein the user selects one number to complete a dialing operation to establish connection with another telephonic device associated with the number selected.

8. The computer readable media according to claim 7, wherein:

said step of determining comprises the steps of, determining a set of numbers matching each having a portion matching the accepted digits;

prioritizing the set of numbers based on predetermined criteria; and said step of displaying the set of numbers comprises the steps of, displaying a highest priority of said set of numbers in a display configured to allow a user to scroll from a highest priority number to other numbers of lesser priority in said set.

9. A telephonic and computing device that performs both telephonic and computing operations, comprising:

a telephone module configured to place and receive telephone calls;

a dialing mechanism configured to accept user dialed digits to be used to place a telephone call to establish connection with another telephonic device using the telephone module wherein the dialing mechanism comprises a number keypad for entry of the dialed digits;

an intelligent phone number selection module configured to display a set of phone numbers with at least some part matching the user dialed digits during dialing operation and after receipt of a user initiated sequence that requests the matching phone numbers from stored data on the telephonic and computing device wherein the stored data comprises phone numbers maintained either in contact information or in lists, including call history lists; and wherein the user initiated sequence which is a long press of a digit on the number keypad is a specific request to change the search mode.

10. The device according to claim 9, wherein the device further comprises a rocker switch that rocks up and rocks down to respectively move up and move down a selection pointer in the displayed menu.

11. A method for selecting a sequence of digits for initiating a call on a telephonic device that also performs computing operations, comprising the steps of:

receiving at least one digit combined with an optional user request from a user via the telephonic device;

comparing the digits entered by the user with stored data comprising phone numbers maintained in one or more lists in a data storage of the telephonic device, the lists including but not limited to a phone list, a history of phone numbers dialed previously via the telephonic device and phone numbers from lists of received and missed calls;

receiving a next digit where the already returned entries are further searched for matching the entered numbers where the search occurs as an automatic process;

displaying a set of phone numbers that match the received digits from the user in a style that is distinct from the style in which a digit is displayed when entered by the user;

receiving a dial command from the user indicating a selected phone number; and dialing the selected phone number to establish communication with another telephonic device identified by the selected phone number; or receiving a cancel command that ends the matching process while preserving the already dialed digits and then receiving a dial command to dial the entered digits.

12. The method according to claim 11, wherein the user request comprises a long press of the next digit on a keypad used to enter the digits to change the mode of search to expand the list of returned numbers.

13. The method according to claim 12, wherein the step of displaying comprises displaying the matching phone numbers in a list in a drop down menu over a dialpad used to enter the digits.

14. The method according to claim 13, further comprising the steps of:

receiving at least one of an up and down command from a hardwired rocker switch;

moving a selection pointer up or down the list of phone numbers in correspondence with any received up and down commands from the rocker switch; and wherein the dialing step comprises the step of dialing another telephonic device with the phone number identified by the pointer at the time of receipt of the user's dial command.

15. A method selecting phone numbers to initiate a dialing operation in a combined telephone and computing device, comprising the steps of:

maintaining in a memory associated with the computing device a pool of phone numbers as stored data in various lists including contact information lists and call history lists;

receiving at least one digit combined with an optional user request from a user via the telephonic device;

comparing the digits entered by the user with stored data comprising phone numbers maintained in one or more lists in a data storage of the telephonic device, the lists including but not limited to a phone list, a history of phone numbers dialed previously via the telephonic device and phone numbers from lists of received and missed calls;

receiving a next digit where the already returned entries are further searched for matching the entered numbers where the search occurs as an automatic process;

displaying a set of phone numbers that match the received digits from the user in a style that is distinct from the style in which a digit is displayed when entered by the user;

receiving a dial command from the user indicating a selected phone number; and dialing the selected phone number to establish communication with another telephonic device identified by the selected phone number; or receiving a cancel command that ends the matching process while preserving the already dialed digits and then receiving a dial command to dial the entered digits.

16. The method according to claim 15, wherein the step of displaying the set of phone numbers further comprises the step of displaying the set of phone numbers in a drop down menu over a keypad used to cause receipt of the digits; and the method further comprises the steps of:

receiving at least one of an up and down command from a hardwired rocker switch;

moving a selection pointer in the displayed list of phone numbers up or down the list of phone numbers in correspondence with any received up and down commands from the rocker switch;

receiving a dial command from a user; and dialing a telephone device when executing the dialing operation with the phone number identified by the pointer at the time of receipt of the user's dial command.

17. The method according to claim 16, wherein the method is embodied in a set of computer instructions stored on a computer readable media that, when loaded into a processor on a PDA telephone combination device and executed, cause the device to perform the steps of the method.

18. The method according to claim 15, wherein the user request comprises a long press of the next digit to change the mode of search or to expand the list of returned numbers.

* * * * *